US007128244B2

(12) United States Patent
Antal, Sr.

(10) Patent No.: US 7,128,244 B2
(45) Date of Patent: Oct. 31, 2006

(54) SAFETY CAP FOR FLUID DISPENSING CARTRIDGES

(75) Inventor: Keith Antal, Sr., Valatie, NY (US)

(73) Assignee: Sonoco Development, Inc., Hartsville, SC (US)

( * ) Notice: Subject to any disclaimer, the term of this patent is extended or adjusted under 35 U.S.C. 154(b) by 258 days.

(21) Appl. No.: 10/485,528

(22) PCT Filed: Jul. 17, 2002

(86) PCT No.: PCT/US02/22727

§ 371 (c)(1), (2), (4) Date: Jan. 28, 2004

(87) PCT Pub. No.: WO03/020599

PCT Pub. Date: Mar. 13, 2003

(65) Prior Publication Data

US 2004/0195273 A1 Oct. 7, 2004

Related U.S. Application Data

(60) Provisional application No. 60/316,759, filed on Aug. 31, 2001.

(51) Int. Cl.
*G01F 11/00* (2006.01)

(52) U.S. Cl. ................. 222/153.01; 222/326; 222/389; 222/494

(58) Field of Classification Search ........... 222/153.01, 222/182, 326, 327, 386, 389, 494; 101/364, 101/366; 347/86, 87
See application file for complete search history.

(56) References Cited

U.S. PATENT DOCUMENTS

| | | | | |
|---|---|---|---|---|
| 5,170,913 | A * | 12/1992 | Spatz | 222/209 |
| 5,226,568 | A * | 7/1993 | Newton et al. | 222/212 |
| 5,680,967 | A * | 10/1997 | Dang et al. | 222/327 |
| 5,971,232 | A * | 10/1999 | Rohr et al. | 222/494 |
| 6,089,418 | A * | 7/2000 | Gaiser et al. | 222/490 |
| 6,095,375 | A * | 8/2000 | Adams et al. | 222/182 |
| 6,112,951 | A * | 9/2000 | Mueller | 222/490 |
| 6,309,059 | B1 * | 10/2001 | Ritter | 347/86 |
| 6,477,956 | B1 * | 11/2002 | Rea et al. | 101/466 |
| 2005/0006407 | A1 * | 1/2005 | Lawson et al. | 222/153.13 |

* cited by examiner

*Primary Examiner*—Joseph A. Kaufman
(74) *Attorney, Agent, or Firm*—Clausen Miller, P.C.

(57) ABSTRACT

A removable safety cap (10) for use with an ink cartridge or other fluid holding container having a nozzle (34) extending from the dispensing end. The safety cap (10) prevents the flow of ink out of the cartridge or, if ink escapes past the dispensing nozzle seal, prevents the flow of ink outside the cap (10). The cap (10) also enables the ink cartridge to be set upright with the dispensing end down without the need for a nest or fixture to help support the cartridge.

8 Claims, 3 Drawing Sheets

SAFETY CAP FOR FLUID DISPENSING CARTRIDGES

This application is a 35 U.S.C. 371 filing of International Application No. PCT/US02/22727. The international application claims priority from U.S. Provisional Application No. 60/316,759, filed Aug. 31, 2001, and U.S. patent application Ser. No. 09/683,567, filed Jan. 18, 2002. Application Ser. No. 09/683,567 is now U.S. Pat. No. 6,474,511.

BACKGROUND

1. Field of the Invention

This patent relates to a safety cap to be placed over the nozzle of a fluid-dispensing cartridge. More particularly, this patent relates to a safety cap to be placed over the dispensing fitment of an ink cartridge of the type used in automatic lithographic printing presses.

2. Description of the Related Art

Modern ink cartridges for printing presses typically comprise a hollow tubular body, a moveable plunger inserted into one end, and a stationary dispensing fitment attached to the opposite end. The dispensing fitment covers the dispensing end of the tubular body and has a built-in nozzle for opening and closing the cartridge. Ink is extruded through the nozzle when the plunger is forced toward the dispensing end either manually or, more commonly, by pneumatic pressure. Typically, the cartridge is filled with ink by placing the cartridge with the dispensing end down, adding the ink through the open plunger end, then inserting the plunger. It is also desirable to ship and store ink cartridges with the dispensing end down.

The dispensing fitment is mounted in sealing engagement within the dispensing (top) end of the tubular body and comprises a covering portion and a nozzle extending from the covering portion. The nozzle serves several functions: (1) it guides the flow of ink from the cartridge when the plunger is activated; (2) it prevents the flow of ink at all other times, including during filling, transportation, storage, and installation of the cartridge on the printing press; and (3) it prevents the introduction of air into the cartridge.

A potential problem with conventional ink cartridges is that, during use, the nozzles can leak ink onto the outside of the dispensing fitment. The ink can then dry and flake off, contaminating the ink reservoir beneath the cartridge.

Another potential problem with conventional ink cartridges is that, because of the protruding nozzles, they cannot be stood on their dispensing end for filling, shipping or storage purposes without using a nest or fixture to keep the cartridge upright and stable.

Another potential problem with conventional ink cartridges is the introduction of air into the cartridge. If an ink cartridge is stored or shipped with the dispensing end up, the ink can shift down due to gravity. If the seal on the dispensing nozzle is not airtight, this shifting can pull air into the cartridge and cause the ink to start curing. Curing reduces the quality of the ink and increases the risk of poor quality dispensing.

Thus it is an object of the present invention to provide a safety cap for use with ink cartridges that prevents the flow of ink past the dispensing nozzle seal.

Another object of the present invention is to provide a safety cap that prevents the flow of ink outside the cap if the ink escapes past the dispensing nozzle seal.

Still another object of the invention is to provide a safety cap that enables an ink cartridge to be set upright with the dispensing end down without the need for a nest or fixture to help support the cartridge.

Another object of the invention is to provide a safety cap that keeps the dispensing nozzle clean and protects it from damage during shipping and handling.

Further and additional objects will appear from the description and accompanying drawings.

SUMMARY OF THE INVENTION

The present invention is a safety cap for use with ink cartridges of the type having a nozzle extending from a dispensing fitment affixed to the dispensing end. The safety cap prevents the flow of ink out of the cartridge or, if ink escapes past the dispensing nozzle seal, prevents the flow of ink outside the cap. The cap also enables the ink cartridge to be set upright with the dispensing end down without the need for a nest or fixture to help support the cartridge.

The cap comprises a hub portion, a substantially cylindrical outer wall surrounding the hub portion, and an annular wall connecting the hub portion to the outer wall. The hub portion is configured to fit closely over the dispensing fitment nozzle and comprises a dome-shaped top wall and a downwardly extending skirt portion terminating in a sealing lip. The sealing lip is adapted to form a seal with the dispensing fitment when the safety cap in installed onto the dispensing fitment. The outer wall of the cap has a top rim upon which the cartridge can stand during filling, storage and transportation. The skirt portion of the hub has inwardly extending locking elements adapted to be engaged by and disengaged from complementary locking elements on the dispensing fitment.

THE DRAWINGS

DETAILED DESCRIPTION OF THE INVENTION

Figure 1:
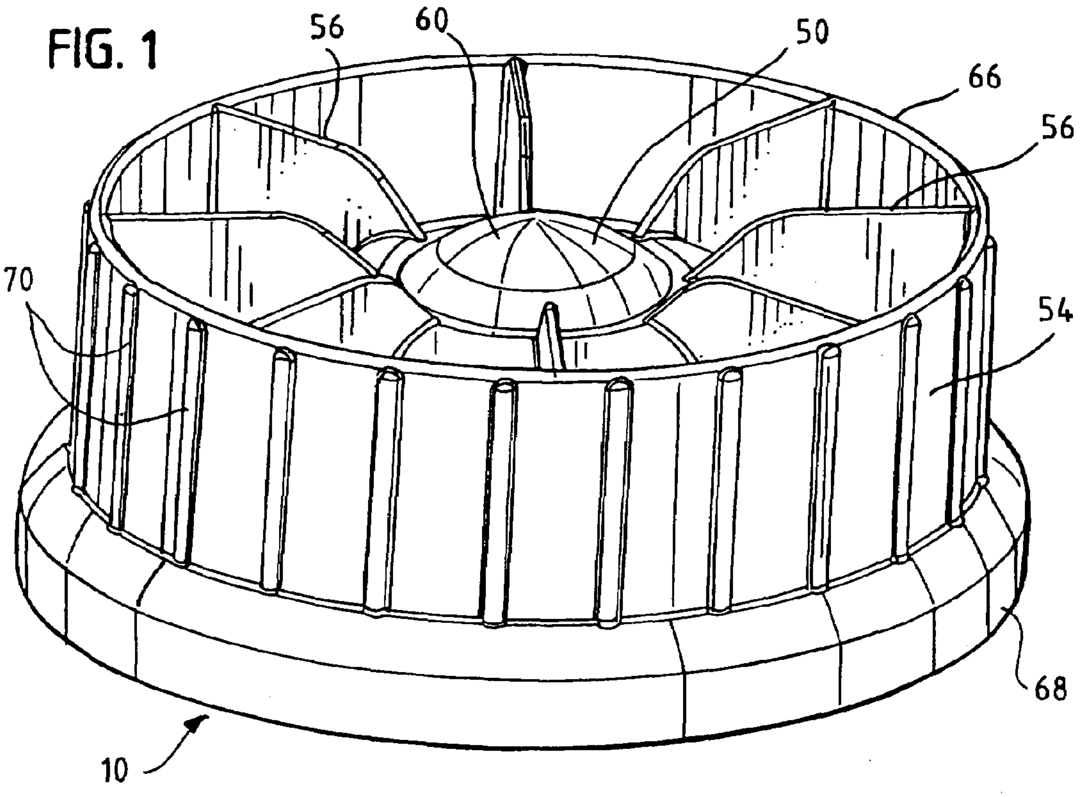
FIG. 1 is a top perspective view of a safety cap according to the present invention.
Figure 2:
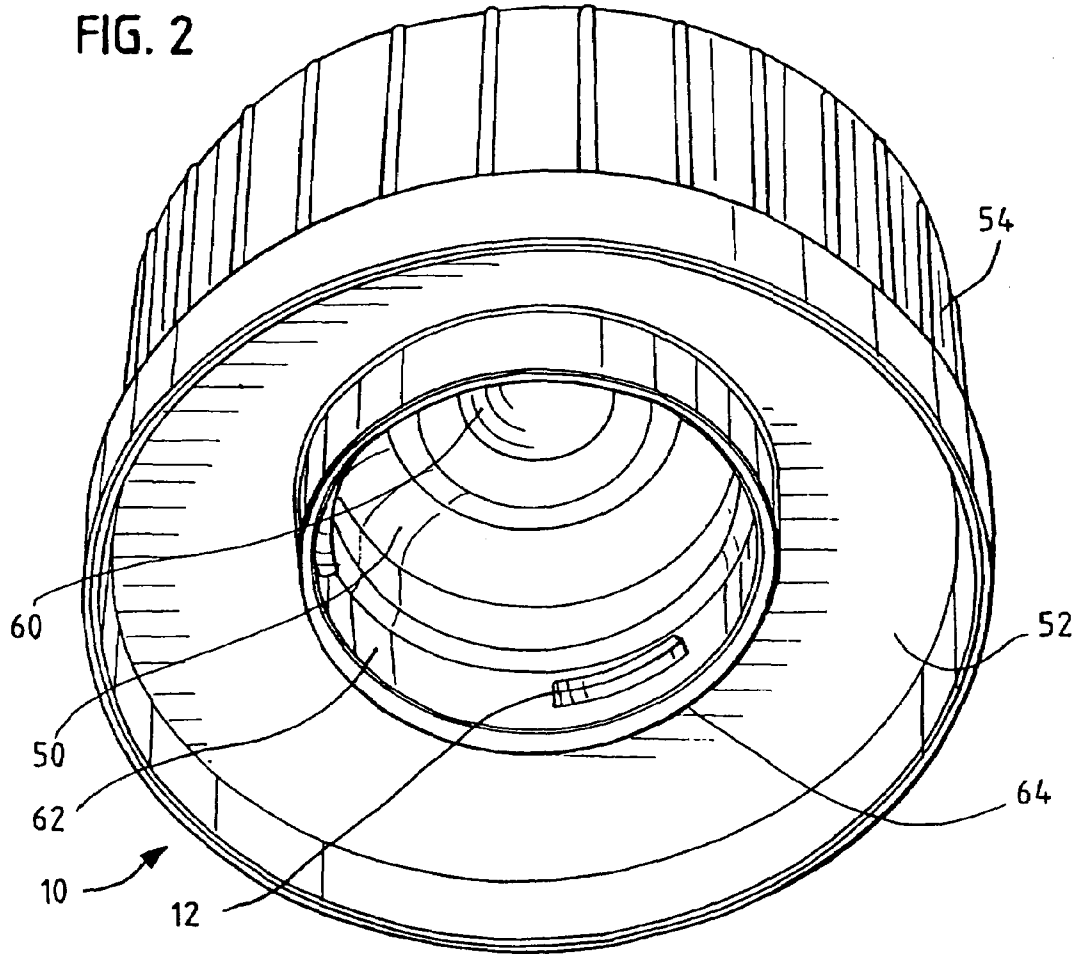
FIG. 2 is a bottom perspective view of the safety cap of FIG. 1.
Figure 3:
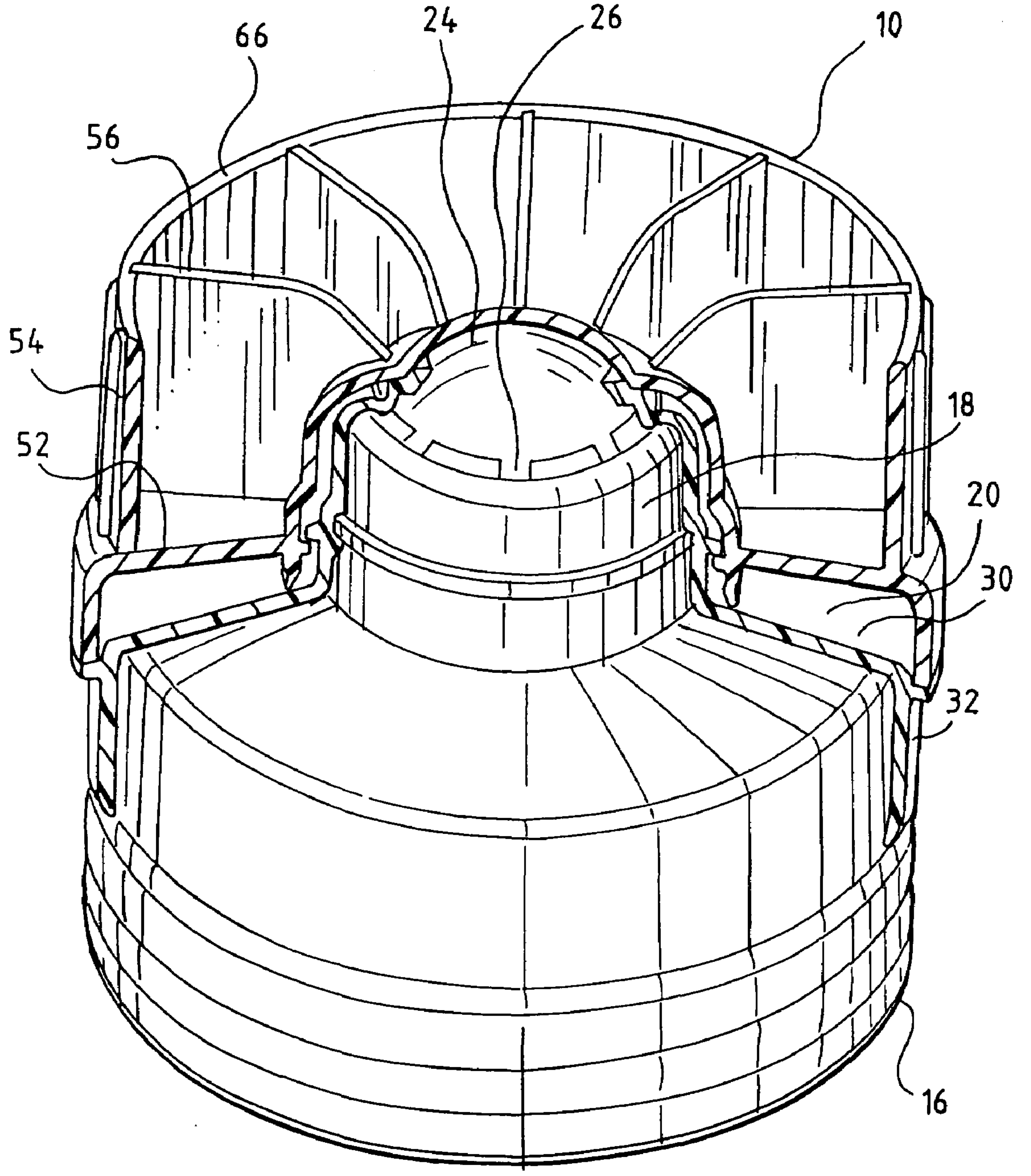
FIG. 3 is a cutaway perspective view of the safety cap of FIG. 1, shown with an ink cartridge dispensing fitment and plunger.
Figure 4:
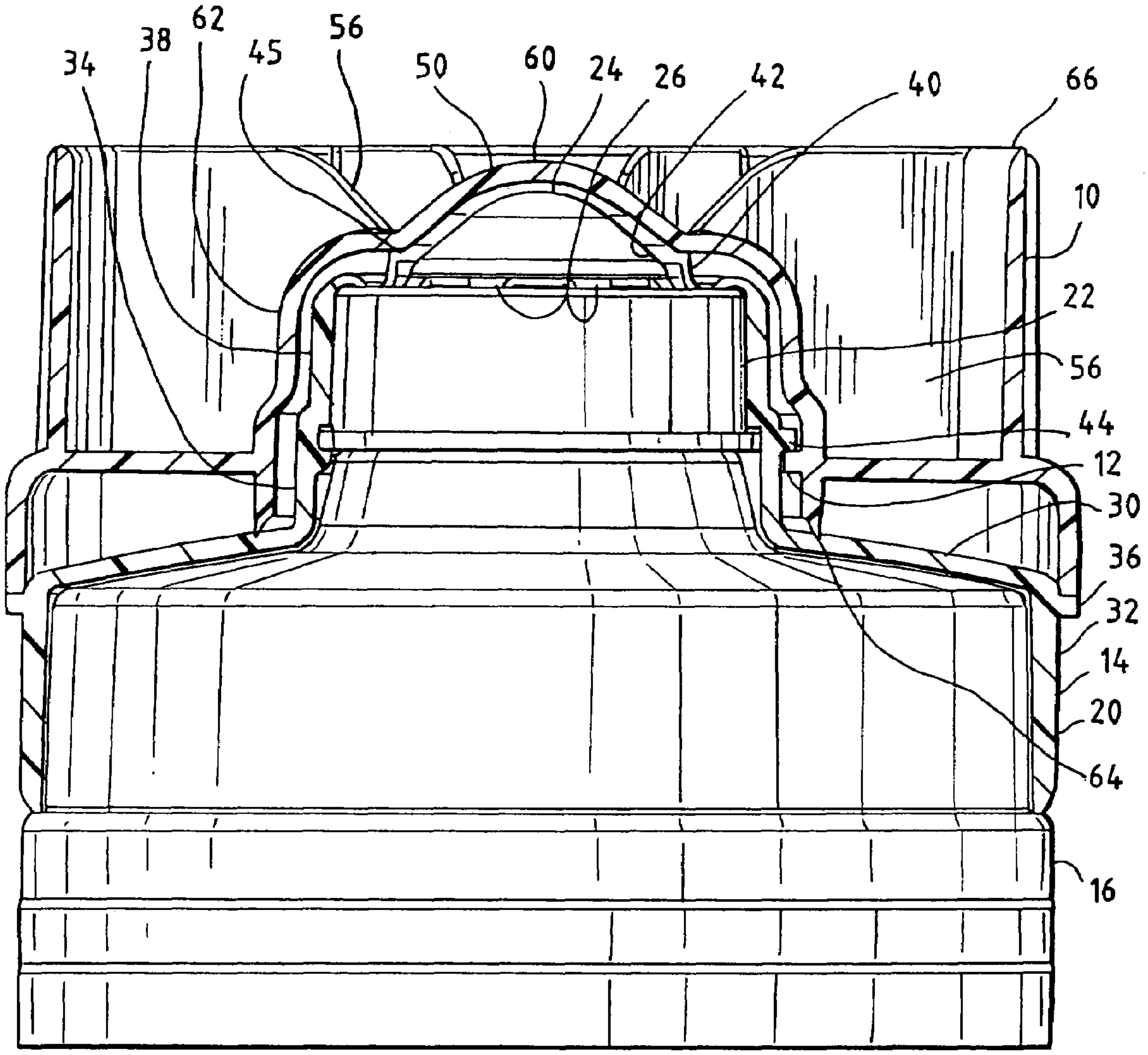
FIG. 4 is a cross-sectional view of the safety cap, dispensing fitment and plunger of FIG. 3.

Turning to the drawings, there is shown in FIGS. 1–2 one embodiment of the present invention, a safety cap 10 for use with an ink cartridge of the type used in lithographic printing presses or other fluid-dispensing container. As shown in FIGS. 2 and 4, the safety cap 10 has locking elements 12 or other attachment means that can be used to attach the safety cap 10 to a dispensing fitment 14. A plunger 16 and a cartridge body (not shown) make up the other components of the assembled ink cartridge.

In the assembled ink cartridge, the cartridge body holds a supply of extrudable ink and has a dispensing end and a plunger end. The plunger 16 is inserted into the plunger end and serves as a piston that is driven through the cartridge body, typically by pneumatic force, to extrude ink through the nozzle portion of the dispensing fitment 14. To minimize wasted ink, the plunger 16 mates closely with the dispensing fitment 14 when the plunger 16 is driven the full length of the ink cartridge. The dispensing fitment 14 is firmly attached to or made part of the dispensing end of the cartridge.

Although the dispensing fitment 14 may take many forms, the preferred embodiment will now be described. Turning to FIG. 4, it will be noted that the dispensing fitment 14 comprises two separately molded plastic parts: an inner (mating) component 18 and an outer component 20.

The inner mating component 18 comprises a cylindrical sidewall 22 and a dome-shaped sealing portion 24 connected to the sidewall 22 by bridges 26. As described in more detail below, ink flows through the spaces between the bridges when the dispensing nozzle is forced open by pressure from the ink. The inner component 18 is affixed to the inside of the outer component 20 and mates closely therewith to prevent ink from getting between the inner and outer components.

The outer component 20 comprises a covering portion 30 for covering the dispensing end of the ink cartridge, a skirt 32 extending downward from the periphery of the covering portion 30, and an upwardly extending nozzle portion 34 mounted over a centrally disposed aperture in the covering portion 30. The skirt 32 fits snugly into the dispensing end of the ink cartridge body (not shown). A flange 36 extends radially outward from the top of the skirt 32 to halt the insertion of the dispensing fitment 14 into the cartridge body.

The nozzle portion 34 of the dispensing fitment 14 comprises a sidewall 38 extending upward from the covering portion 30 and an annular flexible valve portion 40 extending radially inward from the top edge of the nozzle sidewall 38, terminating in a rigid annular rim 42. Locking threads 44 project outwardly from the nozzle sidewall 38 and are configured to receive the safety cap 10.

The flexible valve portion 40 of the nozzle 34 is sufficiently thin and has a geometry that allows it to flex under pressure from a closed position to an open position. The pressure is supplied by the ink when the plunger 16 is driven toward the dispensing end of the cartridge. In the closed position shown in FIG. 4, the annular rim 42 presses against the dome-shaped sealing portion 24 of the inner component 18 to seal off the ink cartridge. This seal is referred to hereinafter as the primary seal. In the open position, the flexible portion 40 flexes upward and outward to create an annular opening between the rim 42 and the sealing portion 24 through which ink can flow.

Although the dispensing fitment 14 just described has a primary seal designed to prevent the leakage of ink when there is no internal pressure placed on the flexible valve 40 by the ink inside the cartridge, it has been found advantageous to provide the ink cartridge assembly with a safety cap to further prevent ink leakage and to provide a means to enable the ink cartridge to be stood on its dispensing end. The safety cap 10 of the present invention fulfills this need.

The safety cap 10 preferably is a one-piece molded plastic part, and in the preferred embodiment comprises a centrally disposed hub portion 50, an annular wall 52 and a substantially cylindrical outer wall 54. The annular wall 52 extends radially outward from the hub portion 18 to the outer wall 54. Optional evenly spaced fins 56 extend radially outward from the hub portion 50 to the outer wall 54 to provide additional structural support. Other structures may be used instead of or in addition to the fins 56 to help support and stabilize the safety cap 10, such as concentrically spaced stiffening rings.

The hub portion 50 is configured to fit closely over the dispensing fitment nozzle 34, and comprises a dome-shaped top wall 60 and a downwardly extending skirt portion 62 that terminates in a sealing lip 64. As explained further below, the sealing lip 64 forms a seal against the dispensing fitment covering portion 30 when the safety cap 10 is installed onto the dispensing fitment 14.

The safety cap locking elements 12 are in the form of inwardly projecting detents and are evenly distributed around the inside wall of the skirt portion 62. To install the safety cap 10 onto the dispensing fitment 14, the cap 10 is oriented such that the locking detents 12 are located above the spaces between the nozzle locking threads 44, pushed in an axial direction onto the dispensing fitment 14 and rotated until the locking detents 12 are fully engaged by the threads 44.

When the safety cap 10 is so installed, the hub portion top wall 60 presses down on the flexible annular portion 40 of the nozzle 34 to force the annular rim 42 against the sealing portion 24, thereby further insuring that ink does not leak from the nozzle 44. In case this primary seal leaks, the annular area 45 where the top wall 60 of the safety cap 10 presses against the annular portion 40 acts as a secondary seal.

When cartridges are stored with the dispensing end up, the contents can shift down due to gravity. If the nozzle is not sealed airtight, this shifting can pull air into the cartridge and ruin the ink. The pressure placed on the flexible annular portion 40 by the hub portion top wall 60 also insures that air does not get pulled into the cartridge.

The safety cap 10 forms a third seal with the dispensing fitment 14 at the annular region near the base of the nozzle 34 where sealing lip 64 contacts the covering portion 30 of the dispensing fitment 14. Thus, the safety cap 10 and dispensing fitment 14 cooperate to form two additional seals to prevent the flow of ink outside the cap 10.

The outer wall 54 of the safety cap 10 has a top rim 66 that defines a plane above which the hub portion 50 does not extend, so that the cartridge can be placed upright on this rim 66 with the dispensing end down during filling, shipping and storage. The diameter of the outer wall top rim 66 should be large enough to provide a stable base for the ink cartridge when it is placed on its dispensing end, and preferably is about the same as the diameter of the ink cartridge itself.

The lower portion 68 of the outer wall 54 fits over the dispensing fitment covering portion 30 near its periphery to help protect the fitment from side impacts. Gripping elements 70 in the form of vertically oriented ridges located on the outer surface of the outer wall 54 facilitate rotating the safety cap 10.

Thus there has been described a safety cap 10 for an ink cartridge or the like that installs over a dispensing fitment 14 of the type described herein or over a similar fitment. The safety cap 10 performs three primary functions: (1) it prevents ink from leaking out of the cartridge when the nozzle 34 is in the closed position by putting pressure on the dispensing mechanism, (2) it prevents air from getting pulled into the cartridge if the cartridge is stored dispenser end up, and (3) it allows the cartridge to be stood on its dispensing end during shipping, filling, transporting and storage.

Other modifications and alternative embodiments of the invention are contemplated which do not depart from the spirit and scope of the invention as defined by the foregoing teachings and appended claims. It is intended that the claims cover all such modifications that fall within their scope.

I claim:

1. A safety cap (10) for a fluid dispensing cartridge of the type that dispenses ink for automated printing presses, the cartridge having a body that holds a supply of ink, the body having a dispensing end fitted with a nozzle (34) and a plunger end into which is inserted a moveable plunger (16), the nozzle (34) capable of moving from a closed position to an open position in response to increased pressure within the cartridge created by movement of the plunger toward the dispensing end, thereby allowing ink to be dispensed from the cartridge, the safety cap (10) comprising:

a hub portion (50) adjacent the nozzle (34) and comprising a top wall (60) and a downwardly extending skirt portion (62), the skirt portion having a distal end located away from the top wall (60);

means for attaching the safety cap (10) to the cartridge;

a cylindrical outer wall (54) surrounding the hub portion (50) and having a top rim (66) upon which the cartridge can stand, the top rim (66) defining a plane above which the hub portion (50) does not extend when the cartridge is positioned with its dispensing end up; and an annular wall (52) extending radially outward from and connecting the distal end of the skirt portion (62) to the outer wall (54).

2. The safety cap of claim 1 wherein the attachment means comprises locking elements (12) extending inwardly from the skirt portion (62) of the hub portion (50) and adapted to be engaged by and disengaged from complementary locking elements (44) on the cartridge.

3. The safety cap of claim 2 wherein the locking elements (12) are in the form of inwardly projecting detents and are evenly distributed around the inside of the skirt portion (62).

4. The safety cap (10) of claim 1 wherein the outer wall (54) has integral gripping elements (70).

5. The safety cap (10) of claim 1 in which the hub portion top wall (34) presses against the nozzle (34) when the cap (10) is installed onto the cartridge to maintain the nozzle (34) in the closed position.

6. A safety cap (10) for a fluid dispensing cartridge of the type that dispenses ink for automated printing presses, the cartridge having a body that holds a supply of ink, the body having a dispensing end fitted with a nozzle (34) and a plunger end into which is inserted a moveable plunger (16), the nozzle (34) capable of moving from a closed position to an open position in response to increased pressure within the cartridge created by movement of the plunger toward the dispensing end, thereby allowing ink to be dispensed from the cartridge, the safety cap (10) comprising:

a hub portion (50) adjacent the nozzle (34) and comprising a top wall (60) and a downwardly extending skirt portion (62);

means for attaching the safety cap (10) to the cartridge;

a cylindrical outer wall (54) surrounding the hub portion (50) and having a top rim (66) upon which the cartridge can stand, the top rim (66) defining a plane above which the hub portion (50) does not extend when the cartridge is positioned with its dispensing end up;

an annular wall (52) extending radially outward from and connecting the skirt portion (62) to the outer wall (54): and a plurality of vertically oriented fins (56) extending radially upward and outward from the hub portion (50) and connecting the hub portion (50) to the outer wall (54).

7. The safety cap (10) of claim 6 in which the hub portion top wall (34) presses against the nozzle (34) when the cap (10) is installed onto the cartridge to maintain the nozzle (34) in the closed position.

8. A removable cap (10) for an ink dispensing cartridge of the type used with automated printing presses, the cartridge having a body that holds a supply of ink, the body having a dispensing end fitted with a nozzle (34) and a plunger end into which is inserted a moveable plunger (16), the nozzle (34) capable of moving from a closed position to an open position in response to increased pressure within the cartridge created by movement of the plunger toward the dispensing end thereby allowing ink to be dispensed from the cartridge, the cap (10) comprising:

a hub portion (50) surrounding the nozzle (34) and comprising a top wall (60) and a downwardly extending skirt portion (62);

a cylindrical outer wall (54) surrounding the hub portion (50) and having a top rim (66) upon which the cartridge can stand, said cylindrical wall (54) displaced away from and connected to the hub portion (50);

means for attaching the cap (10) to the cartridge; and a plurality of vertically oriented fins (56) extending radially outward from the hub portion (50) and connecting the hub portion (50) to the outer wall (54).

* * * * *